United States Patent
Ford

(10) Patent No.: US 9,265,239 B2
(45) Date of Patent: *Feb. 23, 2016

(54) DEEP DIVING FISHING LURE

(71) Applicant: 2327086 Ontario Ltd., Nottawa (CA)

(72) Inventor: Randolph K Ford, Stayner (CA)

(73) Assignee: 2327086 Ontario Ltd., Nottawa, Ontario (CA)

( * ) Notice: Subject to any disclaimer, the term of this patent is extended or adjusted under 35 U.S.C. 154(b) by 260 days.

This patent is subject to a terminal disclaimer.

(21) Appl. No.: 13/839,267

(22) Filed: Mar. 15, 2013

(65) Prior Publication Data

US 2013/0192121 A1 Aug. 1, 2013

Related U.S. Application Data

(63) Continuation-in-part of application No. 12/799,373, filed on Apr. 23, 2010, now Pat. No. 8,429,847.

(51) Int. Cl.
*A01K 85/00* (2006.01)
*A01K 85/16* (2006.01)

(52) U.S. Cl.
CPC .................. *A01K 85/00* (2013.01); *A01K 85/16* (2013.01)

(58) Field of Classification Search
CPC ....................................................... A01K 85/00
USPC .................. 43/42.47, 42.22, 42.23, 43.13
See application file for complete search history.

(56) References Cited

U.S. PATENT DOCUMENTS

| | | | | |
|---|---|---|---|---|
| 1,220,921 A | * | 3/1917 | Wilson | 43/42.22 |
| 1,232,211 A | * | 7/1917 | Burkman | 43/42.22 |
| 1,419,540 A | * | 6/1922 | Brown | 43/42.23 |
| 1,423,025 A | * | 7/1922 | Rodgers et al. | 43/42.23 |
| 1,542,404 A | * | 6/1925 | Paulson | 43/42.22 |
| 1,600,653 A | * | 9/1926 | Steenstrup | 43/42.23 |
| 1,622,063 A | * | 3/1927 | Steenstrup | 43/42.23 |
| 1,694,195 A | * | 12/1928 | Watts | 43/42.47 |
| 2,062,718 A | * | 12/1936 | Kallberg | 43/43.13 |
| 2,079,883 A | * | 5/1937 | Valasek | 43/42.49 |
| 2,579,991 A | * | 12/1951 | Wood | 43/42.22 |
| 2,598,771 A | * | 6/1952 | Eder | 43/42.22 |
| 2,608,016 A | * | 8/1952 | Shipley | 43/42.22 |
| 2,618,093 A | * | 11/1952 | Isaac | 43/42.22 |
| 2,618,096 A | * | 11/1952 | Wagner | 43/42.23 |
| 2,621,438 A | * | 12/1952 | Helin | 43/42.48 |
| 2,663,963 A | * | 12/1953 | Russell | 43/42.49 |
| 2,682,128 A | * | 6/1954 | Weigandt | 43/42.22 |
| 2,753,648 A | * | 7/1956 | Paterno | 43/42.47 |

(Continued)

FOREIGN PATENT DOCUMENTS

| | | | | | |
|---|---|---|---|---|---|
| JP | 10117638 A | * | 5/1998 | | A01K 85/00 |
| JP | 10136836 A | * | 5/1998 | | A01K 85/00 |

(Continued)

*Primary Examiner* — Darren W Ark
(74) *Attorney, Agent, or Firm* — Olson & Cepuritis, Ltd.

(57) ABSTRACT

A deep diving fishing lure having a forwardly-extending diving lip is provided with a fore-and-aft pivotable lure positioning arm pivotably mounted about a pivot axis within the diving lip near the lower portion of the forward face. The lure positioning arm, when fixed in an aft position relative to the pivot axis rests within a longitudinally extending groove located in the diving lip. The lure positioning arm, when in the fixed aft position maintains the lure in a diving position when pulled through a body of water but negates the lure's tendency to dive when released from the aft position.

9 Claims, 4 Drawing Sheets

(56) References Cited

U.S. PATENT DOCUMENTS

| | | | | |
|---|---|---|---|---|
| 2,776,517 | A * | 1/1957 | Borgstrom | 43/42.22 |
| 2,789,386 | A * | 4/1957 | Creelman | 43/42.22 |
| 2,883,785 | A * | 4/1959 | Croft | 43/42.22 |
| 2,904,921 | A * | 9/1959 | Purgason et al. | 43/42.22 |
| 2,976,642 | A * | 3/1961 | Wickman et al. | 43/42.23 |
| 3,462,871 | A * | 8/1969 | McVay | 43/42.47 |
| 3,490,165 | A * | 1/1970 | Thomassin | 43/42.22 |
| 3,583,089 | A * | 6/1971 | Scarbro | 43/43.13 |
| 3,643,370 | A * | 2/1972 | Cook et al. | 43/43.13 |
| 3,844,059 | A * | 10/1974 | Weber | 43/43.13 |
| 3,897,648 | A * | 8/1975 | Neary | 43/43.13 |
| 3,902,267 | A * | 9/1975 | Monchil | 43/42.23 |
| 3,940,872 | A * | 3/1976 | Weber | 43/43.13 |
| 3,950,882 | A * | 4/1976 | Monchil | 43/42.23 |
| 3,971,154 | A * | 7/1976 | Craig | 43/42.23 |
| 4,006,552 | A * | 2/1977 | Cunningham | 43/42.49 |
| 4,129,956 | A * | 12/1978 | Neary | 43/43.13 |
| 4,161,078 | A * | 7/1979 | Pagani | 43/42.22 |
| 4,212,127 | A * | 7/1980 | Daniels | 43/43.13 |
| 4,215,507 | A * | 8/1980 | Russell | 43/42.22 |
| 4,282,672 | A * | 8/1981 | Neary | 43/43.13 |
| 4,567,687 | A * | 2/1986 | Even et al. | 43/43.13 |
| 4,581,842 | A * | 4/1986 | Kalberer | 43/43.13 |
| 4,739,576 | A * | 4/1988 | Davis | 43/42.47 |
| 4,777,761 | A * | 10/1988 | Renaud | 43/42.47 |
| 4,807,388 | A * | 2/1989 | Cribb | 43/42.22 |
| 4,819,365 | A * | 4/1989 | Landuydt | 43/42.47 |
| 4,893,431 | A * | 1/1990 | Ehlers | 43/42.47 |
| 5,168,652 | A * | 12/1992 | Davis | 43/42.23 |
| 5,255,467 | A * | 10/1993 | Haskell | 43/42.22 |
| 5,337,508 | A * | 8/1994 | Pfeiffer | 43/42.22 |
| 5,339,561 | A * | 8/1994 | Weber | 43/43.13 |
| 5,425,193 | A * | 6/1995 | Gelb | 43/4 |
| 5,560,143 | A * | 10/1996 | Allen | 43/42.47 |
| 5,678,349 | A * | 10/1997 | Pacora | 43/42.09 |
| 5,937,569 | A * | 8/1999 | Solheim et al. | 43/42.47 |
| 6,016,622 | A * | 1/2000 | Even | 43/43.13 |
| 6,578,313 | B1 * | 6/2003 | Knol | 43/42.47 |
| 6,931,784 | B1 * | 8/2005 | Sutherland | 43/42.22 |
| 7,107,720 | B2 * | 9/2006 | Burggrabe et al. | 43/42.47 |
| 7,162,829 | B2 * | 1/2007 | Braaten | 43/42.23 |
| 7,316,095 | B1 * | 1/2008 | Petner et al. | 43/42.22 |
| 7,520,087 | B1 * | 4/2009 | Even | 43/43.13 |
| 7,520,088 | B2 * | 4/2009 | Even | 43/43.13 |
| 7,621,068 | B1 * | 11/2009 | Renosky | 43/42.47 |
| 7,703,235 | B2 * | 4/2010 | Ford | 43/42.22 |
| 7,726,062 | B2 * | 6/2010 | Davis | 43/42.47 |
| 8,429,847 | B2 * | 4/2013 | Ford | 43/42.22 |
| 8,776,429 | B2 * | 7/2014 | Ford | 43/42.23 |
| 2008/0104876 | A1 * | 5/2008 | Ito | 43/42.47 |
| 2008/0104881 | A1 * | 5/2008 | Ito | 43/42.47 |
| 2008/0155884 | A1 * | 7/2008 | Sisson | 43/42.47 |
| 2011/0252691 | A1 * | 10/2011 | Heyne | 43/43.13 |

FOREIGN PATENT DOCUMENTS

| | | | | |
|---|---|---|---|---|
| JP | 11113450 | A * | 4/1999 | A01K 85/00 |
| JP | 2000270717 | A * | 10/2000 | A01K 85/00 |
| JP | 2000342118 | A * | 12/2000 | A01K 85/00 |
| JP | 2001000078 | A * | 1/2001 | A01K 85/00 |
| JP | 2004298132 | A * | 10/2004 | A01K 85/00 |
| JP | 2005143446 | A * | 6/2005 | A01K 85/00 |
| JP | 2005185257 | A * | 7/2005 | A01K 85/00 |
| JP | 2006197877 | A * | 8/2006 | A01K 85/00 |
| JP | 2007195482 | A * | 8/2007 | A01K 85/00 |
| JP | 2010081831 | A * | 4/2010 | A01K 85/00 |
| WO | WO 03101190 | A1 * | 12/2003 | A01K 85/00 |

* cited by examiner

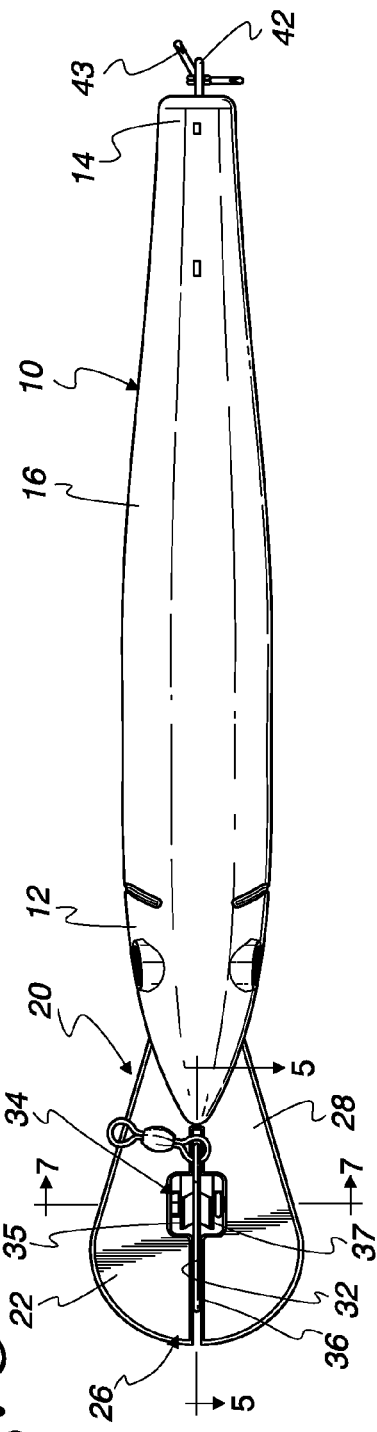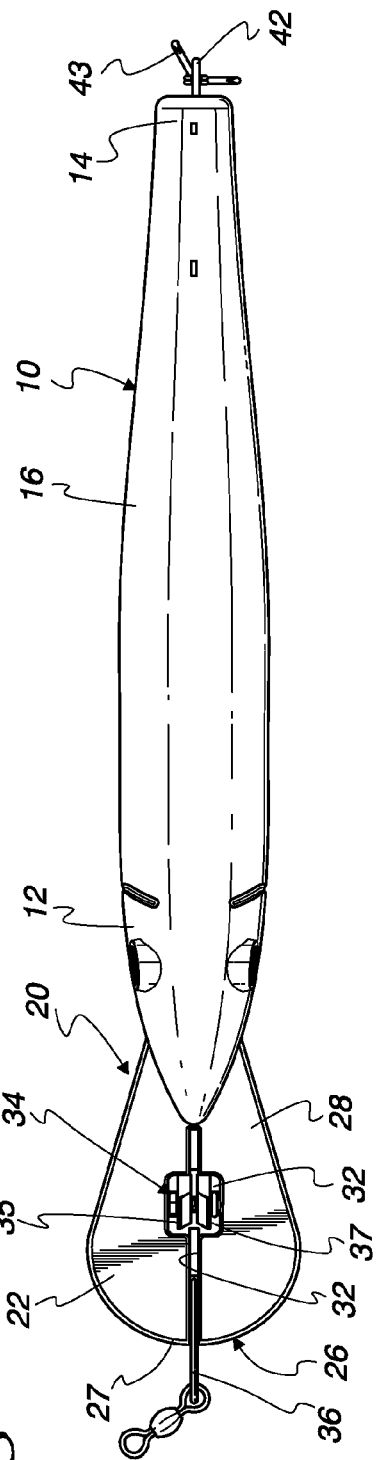

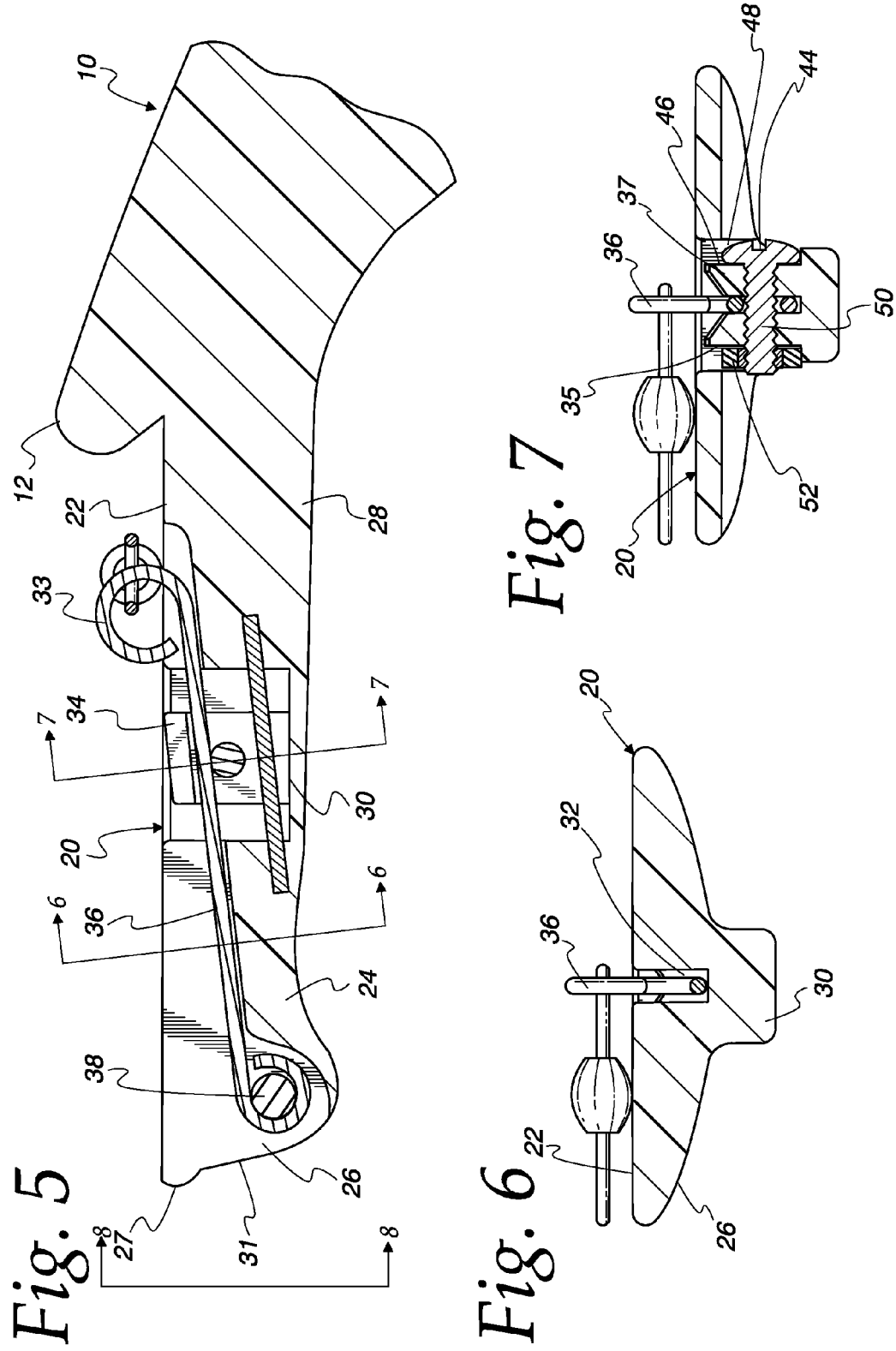

DEEP DIVING FISHING LURE

CROSS-REFERENCE TO RELATED APPLICATIONS

This application is a continuation-in-part of U.S. application Ser. No. 12/799,373, filed Apr. 23, 2010, which is incorporated herein by reference in its entirety.

FIELD OF THE INVENTION

The present invention relates to hydrodynamic fishing devices, and in particular to fishing tackle of the diver sinking type lure, also known as a crankbait.

BACKGROUND OF THE INVENTION

Fishing lures are old in the art. In order to target fish that do not strike bait floating at the surface or those that remain well below the surface, many fishermen use lures designed to dive to various depths within the water. This type of lure is typically buoyant or neutrally buoyant, but is designed to dive below the surface when trolled through the water. Different shaped, colored, and sized lures are used to target different species of fish or based on current water conditions.

Crankbaits known in the prior art usually have a solid lure body with one or more fish hooks attached. A diving plate or lip extends from the first end portion of the lure body, generally angled downwardly relative to the body of the lure. Usually, a fishing line is attached to the diving lip with the other end of the line being wound around a reel or the like, such that when the reel is turned or cranked the lure moves through the water. Water flowing over the diving lip generates a downward force on the lure body forcing it to dive deeper in the water as the lure is pulled forwardly through the water. The lateral width of the diving lip at its widest point should be wider than the widest part of the lure body; however, the diving lip should taper such that the rear portion of the diving lip is nearly the same width as the first end portion of the lure body where the diving lip and lure body. This tapered area allows the water flowing over the diving lip creating the downward force to flow off the diving lip before reaching the lure body, thereby reducing wobble or roll of the lure body as it moves through the water.

Due to their hydrodynamic properties, diving fishing lures are difficult to retrieve, with or without a fish having been hooked by the lure, because forward movement of the lure causes the lure to dive. The present invention effectively removes or at least ameliorates this shortcoming of diving fishing lures.

SUMMARY OF THE INVENTION

A diving fishing lure of the present invention facilitates retrieval of the lure from a body of water as well as setting the hook and landing a fish caught by the lure by immediately repositioning the lure relative to a fishing line during retrieval or while reeling in a fish.

The present fishing lure has an elongated lure body terminating at head and tail portions and provided with a diving lip at the head portion. The diving lip extends downwardly away from the lure body at an acute angle relative to the longitudinal axis of the lure body. The diving lip has a top surface that defines a diving plane, a convex bottom surface, a front portion, and a rear portion. The diving lip has a width and length along the longitudinal axis of the lure body greater than the width; the maximum lateral width of the diving lip is greater than the lateral width of the lure body. A latch including a pivotable lure positioning arm and a catch for the arm is mounted to the diving lip. The proximal end portion of the arm is pivotably mounted to the diving lip about a pivot axis for fore-and-aft movement relative to the pivot axis and so that the arm extends away from the top surface of the diving lip. The catch releasably holds the lure positioning arm in a fixed aft position relative to the pivot axis, thereby orienting the diving lip so as to cause the lure to dive downwardly when pulled through a body of water by a fishing line attached to the lure positioning arm at the distal end. When the arm is not held by the catch and is oriented in a fore position, the arm is substantially aligned with the diving plane when the lure is pulled through a body of water, thereby negating the tendency of the lure to dive.

The diving lip increases in width from the front portion to an intermediate point along the length of the diving lip and thereafter decreases in width until the rear portion of the diving lip merges with the head portion of the lure body defining a tapered area. This tapered area allows the water flowing over the diving lip and creating the downward force to flow off of the diving lip before reaching the lure body, thereby reducing wobble or roll of the lure body.

A fin protrudes from the bottom surface of the diving lip extending longitudinally from the front portion of the diving lip to the rear portion of the bottom surface of the diving lip. The fin terminates in two ears at the proximal end, preferably with the pivot axis located therebetween, which form the front face of the lure. The ears define a groove in the diving lip extending from the front face to an intermediate point along the length of the diving lip such that the lure positioning arm when in a fixed aft position rests within the groove thereby reducing drag as the lure dives through the water. In a preferred embodiment, the groove widens near the distal end to accommodate the catch. The catch is mounted to the diving lip within the groove thereby reducing drag associated with the catch as the lure is pulled through the water.

BRIEF DESCRIPTION OF THE DRAWINGS

In the accompanying drawings that form part of the specification, and in which like numerals are employed to designate like parts throughout the same.

FIG. 3 is a top view of the lure with the lure positioning arm in the fixed aft position.

FIG. 4 is a top view of the lure with the lure positioning arm in the fore position.

FIG. 5 is a cross sectional view of the lure of FIG. 3 taken along plane 5-5.

FIG. 6 is a cross sectional view of the diving lip of the lure of FIG. 3 taken along plane 6-6.

FIG. 7 is a fragmentary sectional view illustrating an embodiment that utilizes an adjustable catch for receiving a lure positioning arm.

DESCRIPTION OF THE PREFERRED EMBODIMENT

A deep diving fishing lure embodying the present invention has a diving lip extending from an elongate lure body. Within the diving lip is situated a latch with a catch and a pivotable lure positioning arm. The lure positioning arm is pivotably mounted to the diving lip via a pin or similar attachment. The pin serves as the pivot axis about which the lure positioning arm pivots. In the fixed aft position, relative to the pivot axis, the lure positioning arm facilitates the lure diving downwardly in the water upon trolling; in the released fore position, the lure positioning arm positions the lure to negate its tendency to dive thereby, facilitating retrieval of the lure from the water. A fin protruding from the bottom surface of the diving lip, extends longitudinally from the front portion of the diving lip to the rear portion of the bottom surface of the diving lip. The fin terminates in two ears at the proximal end forming the front face of the lure. Preferably, the pivot axis is located between the ears, near the front portion of the diving lip and in the lower third of the diving lip. More preferably, the pivot axis is located less than 1/10 the length of the diving lip away from the leading edge of the diving lip. The ears and diving lip define a groove located in the front face and top surface of the diving lip which accommodates the catch and, when in the fixed aft position, the lure positioning arm to reduce drag as the lure moves through the water.

Figure 1:
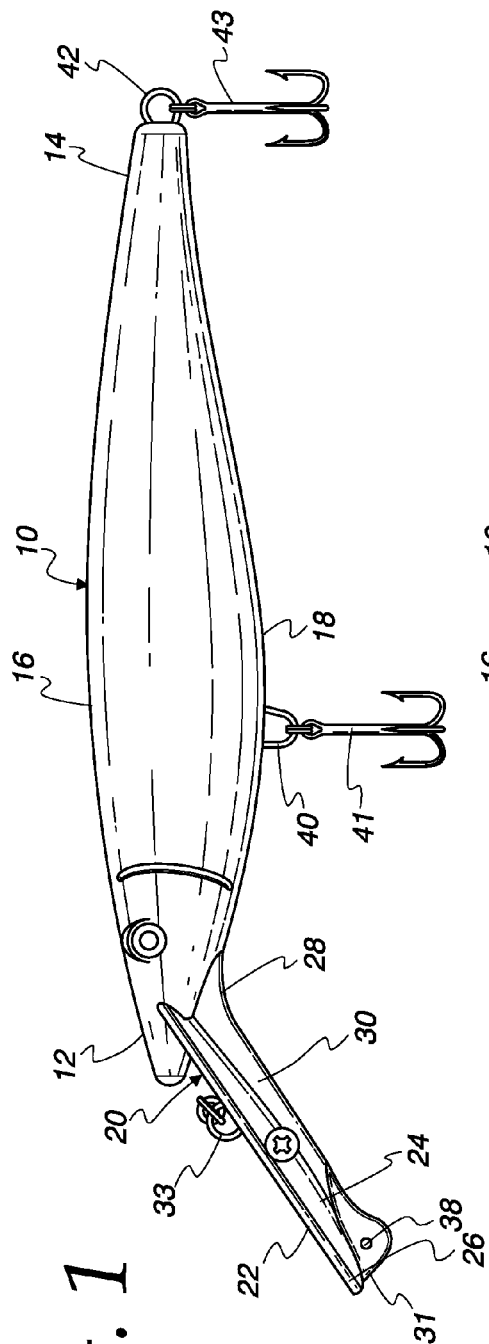
FIG. 1 is a side elevational view of the lure with the lure positioning arm in the fixed aft position.

Referring to the drawings and particularly to FIG. 1, an elongate lure body 10 is depicted having a first end portion or head portion 12, a second end portion or tail portion 14, a top side 16, and a bottom side 18. A diving lip 20 extends from the head portion 12 of the lure body 10. Diving lip 20 has a top surface 22, a convex bottom surface 24, a front portion 26, and rear portion 28. A latch located within diving lip 20 includes lure positioning arm 36 (FIG. 2) which is pivotably mounted to diving lip 20 via pin 38. Pin 38 serves as the pivot axis for fore-and-aft movement of lure positioning arm 36; lure positioning arm 36 is adapted for attachment to a fishing line at the proximal end portion 33. When in the latched position, lure positioning arm 36 is fixed aft of the pivot axis defined by pin 38 and facilitates the lure diving downward in the water upon trolling.

Figure 2:
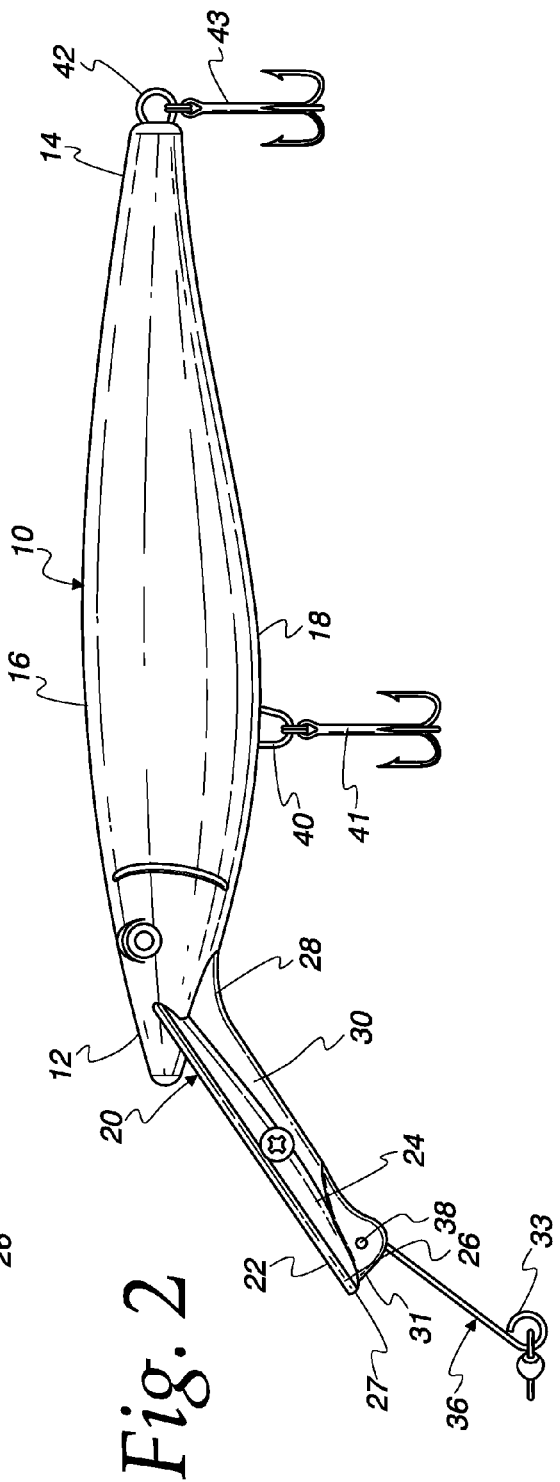
FIG. 2 is a side elevational view of the lure with the lure positioning arm released from the fixed aft position.

Referring to FIG. 2, lure positioning arm 36 is depicted released from the fixed aft position. As shown in FIG. 1 and FIG. 2, a fin 30 protruding from the bottom surface 24 of the diving lip 20 extends longitudinally along the centerline of the lure from approximately the front portion 26 of the diving lip 20 to the rear portion 28 of the diving lip. In a preferred embodiment, fin 30 extends along the centerline of the lure from approximately the leading edge 27 of diving lip 20 to the rear portion, merging with the bottom side of the head portion 12 of the lure body. This results in forward face 31 of lure 10 extending downwardly from leading edge 27. Eyelets 40 and 42 extend from the bottom side 18 and tail portion 14 of lure body 10 for respective attachment of fish hooks 41, 43 or the like.

Referring to FIG. 3 and FIG. 4, top views of fishing lure 10 are depicted. Diving lip 20 defines groove 32. In a preferred embodiment, groove 32 extends from leading edge 27 to an intermediate point near the rear portion 28 of diving lip 20 and is wide enough to accommodate lure positioning arm 36 therein. Groove 32 is wider near the distal end to accommodate catch 34 therein. Preferably, the top of catch 34 is located below or flush with the top surface 22 of diving lip 20 to reduce drag as lure 10 moves through the water. When in the fixed aft position, lure positioning arm 36 rests entirely or substantially within groove 32 to reduce drag when the lure 10 is diving through the water. Catch 34 includes a pair of upstanding, tapered cusps 35 and 37 spaced from one another to receive lure positioning arm 36 therebetween. Cusps 35 and 37 are configured for back-and-forth movement relative to one another. As shown in FIG. 3, catch 34 releasably holds lure positioning arm 36 in the fixed aft position during trolling. In the latched aft position, lure positioning arm 36 facilitates the downward diving motion of lure 10. In response to the strike of a fish, catch 34 releases lure positioning arm 36, permitting the arm to move to the fore position, thereby facilitating retrieval of the lure and, if the fish is caught, prompt setting of the hook and landing the hooked fish. FIG. 4 depicts lure positioning arm 36 in the released, fore position. Preferably, catch 34 does not project above the top surface 22 of diving lip 20 but is flush with top surface 20.

Cross-sectional views of lure 10 are depicted in FIG. 5, FIG. 6, and FIG. 7. Referring to FIG. 5, in the preferred embodiment catch 34 is located entirely within groove 32 thereby reducing drag through the water. The pivot axis about which lure positioning arm 36 pivots is defined by pin 38 located near the leading edge of diving lip 20 and in the lower portion of fin 30. Diving lip 20 together with fin 30 define groove 32. Lure positioning arm 36 is received in groove 32 and pivot about a pivot axis defined by pin 38 located at or near the bottom of front face 31, preferably about one-tenth of the length of the diving lip away from the leading edge 27 of diving lip 20. Catch 34 is responsive to the strike of a fish and releases lure positioning arm 36 so that arm 36 can pivot to the fore position, facilitating removal of the lure from the water Referring to FIG. 6, a cross-sectional view of the diving lip 20 is depicted. Lure positioning arm 36 is releasably held in the fixed aft position. In the preferred embodiment, all or nearly all of lure positioning arm 36 is located within groove 32 further reducing drag as the lure moves through the water.

The tapered cusps of the catch releasably holding the lure positioning arm can be situated at a fixed spacing from one another, as shown in FIGS. 3-6, or the spacing thereof can be adjustable as shown in FIG. 7. In particular, cusps 35 and 37 of catch 34 are spaced from one another and the spacing therebetween can be adjusted by a fastener connecting cusps 35 and 37, such as screw 50. Channel 48 passes through diving lip 20 and through cusps 35 and 37 to accommodate a fastener 50 such as a screw or bolt. Fastener 50 can be threadedly received in nut 52 located on the opposite side of catch 34 from the head 44 of fastener 50. Head 44 of fastener 50 abuts outboard side 46 of cusp 37. As head 44 is turned clockwise, fastener 50 is threaded into nut 52, and cusps 35 and 37 are drawn toward one another, reducing the spacing therebetween, and thereby tightening the grip on lure positioning arm 36 situated between cusps 35 and 37. Similarly, as head 44 is turned counterclockwise, cusps 35 and 37 move away from each other and the space therebetween is increased, thus the grip on lure positioning arm 36 is loosened.

The contour of diving lip 20 preferably is such that the width of lip 20 gradually increases in a direction from leading edge 27 of front portion 26 to a maximum at a point intermediate the length of diving lip 20 and then decreases as the rear portion 28 approaches and ultimately adjoins lure body 10 at the head portion 12 thereof.

Figure 8:
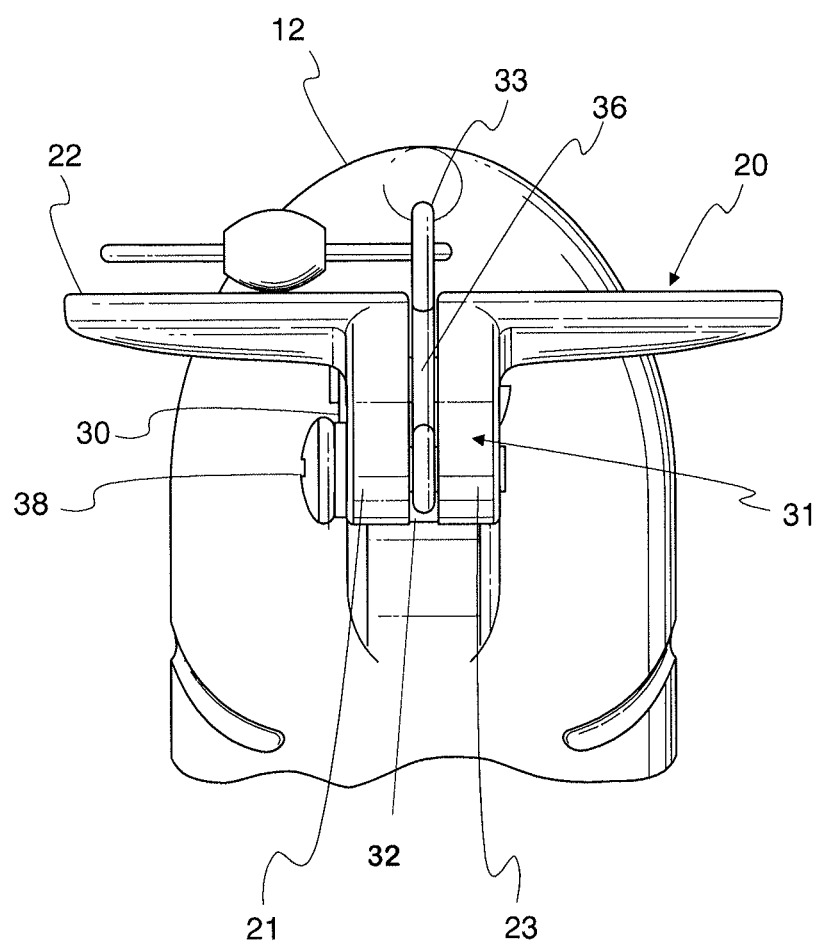
FIG. 8 is a front elevational view of the diving lip of the lure of FIG. 1.

Referring to FIG. 8, a front elevation of diving lip 20 is depicted. Fin 30 terminates in ears 21 and 23 at the proximal end. The proximal end of lure positioning arm 36 is mounted therebetween via pin 38. Ears 21 and 23 define groove 32 at forward face 31.

The foregoing specification and the drawings are intended as illustrative but are not to be taken as limiting of the present invention. Still other variations and rearrangements of parts are possible without a departure from the spirit and scope of the present invention.

I claim:
1. A deep diving fishing lure, comprising:
an elongate lure body having head and tail portions, a top side, an underside, and a longitudinal axis;
a diving lip extending away from the head portion at a downward angle relative to the longitudinal axis of the lure body, said diving lip having a top surface defining a diving plane, a bottom surface, and front and rear portions, and having a maximum lateral width greater than a lateral width of said lure body;

a fore-and-aft pivotable lure positioning arm in the diving lip and extendable above the top surface of the diving lip, said lure positioning arm being pivotably mounted to said diving lip about a pivot axis at a proximal end portion thereof and terminating at a distal end portion thereof in an eyelet for attachment of a fishing line;

a catch in the diving lip adapted to releasably engage the lure positioning arm, wherein:

the catch releasably holds the lure positioning arm in a fixed aft position relative to said pivot axis causing the lure to dive downwardly when pulled through the water by a fishing line attached to the lure positioning arm and releases the lure positioning arm when a fish strikes the lure;

at least one eyelet extending from said underside of said lure body for attachment of a fishing hook; and the lure positioning arm pivots about said pivot axis located at the front portion of the diving lip less than about 1/10 of a length of the diving lip away from a leading edge thereof.

2. A lure as in claim 1, wherein:
said top surface of the diving lip defines a longitudinally extending groove;
said catch includes a pair of opposed cusps within said groove and is positioned so that the top of said catch is flush with said top surface of the diving lip; and
said lure positioning arm is received within said groove.

3. A lure as in claim 1, wherein:
an additional eyelet for attaching a fish hook extends from said tail portion of said lure body.

4. A lure as in claim 1, wherein:
the width of said diving lip increases from said front portion to a maximum at a point intermediate the length of the diving lip, and thereafter decreases until the rear portion thereof adjoins the lure body.

5. A lure as in claim 1, further comprising:
a fin protruding from the bottom surface of said diving lip extending longitudinally from near the leading edge of the bottom surface of said diving lip to the rear portion of said diving lip; wherein:

a proximate end of said fin forms the forward face of said diving lip;
said forward face comprises one or more ears; and
said one or more ears define a groove in said forward face.

6. A lure as in claim 1, wherein:
the catch has a pair of spaced, opposed cusps capable of back-and-forth movement relative to one another; and
a fastener for adjusting spacing between the cusps is operably associated with the cusps.

7. A lure as in claim 6 wherein:
the fastener is a screw that passes through the cusps and is threadedly engaged with a nut.

8. A deep diving fishing lure, comprising:
an elongate lure body having first and second end portions, a top side and an underside, and a longitudinal axis;
a diving lip extending from said first end portion of said lure body, and having a width and a length along the longitudinal axis of the lure body, wherein the length is greater than the width,
said diving lip having a top surface defining a diving plane, a bottom surface, and front and rear portions, and having a maximum lateral width greater than a lateral width of said lure body;
a latch located in said diving lip, said latch including a fore-and-aft pivotable lure positioning arm extendable above the top surface of the diving lip and an adjustable catch for receiving the lure positioning arm, the lure positioning arm being adapted for attachment to a fishing line, the catch releasably holding the lure positioning arm in a fixed aft position thereby causing the lure to dive downwardly when pulled through the water by a fishing line attached to the lure positioning arm; and
at least one eyelet extending from the underside of said lure body for attachment of a fishing hook;
said adjustable catch having a pair of adjustably spaced, opposed cusps and a fastener that passes through the cusps and is threadedly engaged with a nut for adjusting a space between the opposed cusps.

9. A lure as in claim 8 wherein the fastener is a screw.

* * * * *